United States Patent
Minowa

(10) Patent No.: US 8,274,683 B2
(45) Date of Patent: Sep. 25, 2012

(54) PRINTING APPARATUS, CONTENT-RECORDED DISK MAKING APPARATUS, KIOSK TERMINAL, METHOD OF CONTROLLING PRINTING APPARATUS AND PROGRAM THEREFOR

(75) Inventor: Masahiro Minowa, Hatamachi (JP)

(73) Assignee: Seiko Epson Corporation, Tokyo (JP)

( * ) Notice: Subject to any disclaimer, the term of this patent is extended or adjusted under 35 U.S.C. 154(b) by 649 days.

(21) Appl. No.: 12/375,923

(22) PCT Filed: Jun. 4, 2007

(86) PCT No.: PCT/JP2007/000600
§ 371 (c)(1),
(2), (4) Date: Jan. 30, 2009

(87) PCT Pub. No.: WO2008/015770
PCT Pub. Date: Feb. 7, 2008

(65) Prior Publication Data
US 2009/0237704 A1  Sep. 24, 2009

(30) Foreign Application Priority Data

Jul. 31, 2006  (JP) .................................. 2006-207557

(51) Int. Cl.
G06K 15/00 (2006.01)
G06F 3/12 (2006.01)
B41J 2/435 (2006.01)
G11B 27/36 (2006.01)
G11B 20/18 (2006.01)
G09G 5/10 (2006.01)
G06T 17/00 (2006.01)

(52) U.S. Cl. ...................... 358/1.15; 358/1.18; 358/1.13; 358/1.12; 347/224; 347/4; 369/53.41; 369/53.13; 369/53.2; 345/619; 345/428

(58) Field of Classification Search .................. 358/1.18, 358/1.15, 1.12, 1.13; 345/619, 428; 347/224; 400/70
See application file for complete search history.

(56) References Cited

U.S. PATENT DOCUMENTS 5,967,676 A * 10/1999 Cutler et al. .................... 400/70
7,492,385 B2 * 2/2009 Kwasny et al. ............... 347/224
7,522,174 B2 * 4/2009 Yamamoto et al. ........... 345/619
7,847,969 B2 * 12/2010 Iwanaga et al. .............. 358/1.18
(Continued)

FOREIGN PATENT DOCUMENTS
EP         0 942 417 A2    9/1999
(Continued)

Primary Examiner — Akwasi M Sarpong
(74) Attorney, Agent, or Firm — Kilpatrick Townsend & Stockton LLP

(57) ABSTRACT

Provided herein is a printing apparatus having a frame image take-in means which takes in a plurality of frame images at a predetermined interval from a content file as recorded target including image information on an optical disk medium, a frame image discriminating means which discriminates whether each of the taken-in frame images is appropriate for printing on a label face by comparing each of the frame images taken in by the frame image take-in means with prior and following frame images thereof and using a discriminating result whether differences between the taken-in frame images and the prior and following frame images thereof are small, a label print data generating means which generates label print data to be printed on the label face of the optical disk medium based on frame images discriminated as appropriate for printing on the label face by the frame image discriminating means, and a label print means which prints the label print data generated on the label face of the optical disk medium.

9 Claims, 7 Drawing Sheets

U.S. PATENT DOCUMENTS

| | | | |
|---|---|---|---|
| 2003/0179674 A1* | 9/2003 | Anderson et al. | 369/53.21 |
| 2003/0185144 A1* | 10/2003 | Anderson et al. | 369/284 |
| 2004/0034441 A1* | 2/2004 | Eaton et al. | 700/94 |
| 2006/0291801 A1* | 12/2006 | Kato et al. | 386/83 |
| 2007/0067723 A1* | 3/2007 | Hosoda et al. | 715/723 |
| 2007/0188809 A1* | 8/2007 | Noda | 358/1.18 |

FOREIGN PATENT DOCUMENTS

| | | | |
|---|---|---|---|
| JP | 11-259764 A | | 9/1999 |
| JP | 2003-091892 A | | 3/2003 |
| JP | 2003-255960 A | | 9/2003 |
| JP | 2003-259291 A | | 9/2003 |
| JP | 2004-192735 A | | 7/2004 |
| JP | 2005-235359 A | | 9/2005 |
| JP | 2006-014161 A | | 1/2006 |
| JP | 2006014161 | * | 1/2006 |
| JP | 2006-115811 A | | 6/2006 |

* cited by examiner

PRINTING APPARATUS, CONTENT-RECORDED DISK MAKING APPARATUS, KIOSK TERMINAL, METHOD OF CONTROLLING PRINTING APPARATUS AND PROGRAM THEREFOR

This application is a U.S. National Phase of PCT/JP2007/000600, filed Jun. 4, 2007, which claims priority to Japanese Patent Application No. 2006-207557, filed Jul. 31, 2006. The entire disclosure of which is expressly incorporated by reference herein.

TECHNICAL FIELD

The present invention relates to a printing apparatus which prints on a label face of an optical disk, a content-recorded disk making apparatus, a kiosk terminal, a method of controlling the printing apparatus and a program therefor.

BACKGROUND ART

There are known a printing apparatus which prints on a label face of an optical disk or on a label to be adhered on the label face thereof, and a software for label printing to achieve the above printings (for example, patent documents 1 and 2). Also, there is known an optical disk apparatus capable of recording a content on the optical disk and label printing by laser (for example, patent documents 3 and 4).

In this kind of apparatus, it is common to print a photo and an image which are preferred by a user, in addition to a title of the content recorded on the optical disk. There is also known an apparatus in which a desired template among a plurality of pre-stored templates is selected and only the title is input, leading the label printed in visually good. These printings are for deriving originality and the most important goal thereof is "identification and recognition of the content". For "recognition of the content" purpose, there is known an apparatus in which frame images are taken in from the content to be printed on the label as thumbnail images thereof (for example, patent documents 3 and 4).

[Patent Document 1] JP-A-2003-091892
[Patent Document 2] JP-A-2004-192735
[Patent Document 3] JP-A-2005-235359
[Patent Document 4] JP-A-2006-155811

However, in a case that label printing using the taken-in frame images (thumbnail images) is adopted, when the frame images are taken in from a scene with a dynamic motion, the images could be blurred. In this case, unclear images are printed on a label, resulting in improper printings for the "recognition of the content".

In view of the above mentioned problem, the invention has an advantage of providing a printing apparatus capable of performing label printing easily in which a content can be clearly recognized, a content-recorded disk making apparatus, a kiosk terminal, a method of controlling the printing apparatus and a program therefor.

DISCLOSURE OF THE INVENTION

According to an aspect of the invention, there is provided a printing apparatus having frame image take-in means which takes in a plurality of frame images at a predetermined interval from a content file as recorded target including image information on an optical disk medium, frame image discriminating means which discriminates whether each of the taken-in frame images is appropriate for printing on a label face by comparing each of the frame images taken in by the frame image take-in means with prior and following frame images thereof and using a discriminating result whether differences between the taken-in frame images and the prior and following frame images thereof are small, label print data generating means which generates label print data to be printed on the label face of the optical disk medium based on frame images discriminated as appropriate for printing on the label face by the frame image discriminating means, and label print means which prints the label print data generated on the label face of the optical disk medium.

According to another aspect of the invention, there is provided a method of controlling a printing apparatus including: taking in a plurality of frame images at a predetermined time interval from a content file as recorded target including image information on an optical disk medium, discriminating whether each of the taken-in frame images is appropriate for printing on a label face by comparing each of the frame images taken in by the frame image taking-in with a prior and following frame images thereof and using a discriminating result whether differences between the taken-in frame images and the prior and following frame images thereof are small, generating label print data to be printed on the label face of the optical disk medium based on frame images discriminated as appropriate for printing on the label face by the discrimination, and printing the label print data generated on the label face of the optical disk medium.

According to the above configurations, it is possible to print at least a plurality of scenes of the content because label printing is performed based on the plurality of frame images taken in from the content file at the predetermined time interval, thereby the content can be recognized by glancing the printed objects. Therefore, even a beginner can easily perform label printing by which the content can be recognized. In a case that differences between the taken-in frame images and the prior and following frame images thereof are small, a less motion scene is discriminated as appropriate image, causing obscure images such as blurred images to be excluded from label print targets. Therefore, a user can recognize the content clearly.

"Printing on the label face of the optical disk medium" includes label printing by which a label for adhering on the label face is printed, in addition to face direct printing by which the label face of the optical disk is directly printed. Also, the "predetermined time interval" may be equal interval or unequal interval such as one minute after, ten minutes after, one hour after, or the like.

The discrimination "whether the image is appropriate for printing on the label face" includes discriminations based on various discriminating criteria such that only text image is inappropriate from an image analysis result or image including a face of a person is appropriate, other than using a discriminating result with differences between the taken-in frame images and the prior and following frame images.

In the above printing apparatus, it is preferable that the frame image take-in means repeats taking in the plurality of frame images at another time interval different from the predetermined time interval when the frame images discriminated as appropriate for printing on the label face by the frame image discriminating means are less than a predetermined number.

According to the above configuration, it is surely possible to take in a predetermined number of frame images appropriate for printing on the label face.

In the above printing apparatus, it is preferable that candidate image display means which displays frame images more than the predetermined number discriminated as appropriate for printing on the label face by the frame image discriminating means as candidate to be printed on the label face, and image selection control means which supports and controls a selection for print target images among the candidate images displayed are further provided, and the label print data generating means generates the label print data based on the print target images selected.

According to the above configuration, by displaying the frame images more than the predetermined number as candidate images for label printing, the user can select desired print target images among the candidate images displayed. Therefore, it is possible to perform label printing using images that the user prefers or that are appropriate for recognizing the content.

In the above printing apparatus, it is preferable that template store means which stores a plurality of templates for the label print data, template candidate display means which displays the plurality of templates as selection candidate, and template selection control means which supports and controls a selection for at least one template among the plurality of templates displayed are further provided, and the label print data generating means generates the label print data by reading out the template selected from the template store means by the template selection control means and placing the print target images selected by the image selection control means according to a read out template.

According to the above configuration, it is easily possible to label print impressively because the print target images selected by the user are placed based on the template. As the user can select a desired template, it is possible to perform label printing in accordance with the user's preference.

It is preferable that a template is selected before the print target images are selected. According to the configuration, it is possible to select image target images corresponding to the number of images which can be placed on the template.

It is preferable that the printing apparatus is further provided with label print data display means which displays the label print data generated by the label print data generating means, and label print data edit means which performs an edit operation including change of the templates or modification of arrangement positions for the print target images regarding label print data displayed, and the label print means prints edited label print data.

According to the configuration, it is possible to perform original label printing in accordance with the user's desire because the user can confirm a preview display of label print and can perform edit operation including changes of templates or modifications of arrangement positions of the print target images.

According to another aspect of the invention, there is provided a content-recorded disk making apparatus having: each of the means in the above printing apparatus and content record means which records the content file on the optical disk medium.

According to the above configuration, recording of the content file and label printing can be performed by a single apparatus (a content-recorded disk making apparatus).

According to another aspect of the invention, there is provided a kiosk terminal including: each of the means in the content-recorded disk making apparatus above, a network connector which obtains a content file via a network, an optical disk medium container capable of receiving a plurality of optical disk media therein, an operation section which selects information and inputs information, a display section which displays various pieces of information, an optical disk recorder which writes in an optical disk medium with the content record means, a printer which prints on a label face of the optical disk medium by the label print means, and an optical disk eject section at which the optical disk medium is taken out. The kiosk terminal further includes content candidate display means which displays selection candidates of the content file on the display section, content obtaining means which obtains a corresponding content file via the network connector based on a selection result of the content file selected by the operation section, and optical disk medium eject means which ejects a content-recorded disk to the optical disk eject section, the disk being fed from the optical disk medium container, recorded the content file therein with the optical disk recorder and printed on the label face thereof by the printer.

According to the above configuration, the user can obtain the content file easily because the kiosk terminal provides the optical disk medium with a content file desired by the user. As a content-recorded disk making service is provided by the kiosk terminal as an unmanned information terminal, a provider for setting the kiosk terminal can have advantage by which labor cost can be cut down and a user can can clandestinely select a preferred content file.

In the above kiosk terminal, it is preferable that the content file is a recorded file in which a broadcasting program is recorded, and the content candidate display means displays a past broadcasting program list as a selection candidate of the content file.

According to the above configuration, it is easily obtain a television broadcasting program and the like which the user missed to watch.

In this case, it is preferable that frame images are taken in from a main part of the television broadcasting program except commercial films. According to the configuration, it is possible to avoid using a scene erroneously in the commercial film irrelevant of the main part of the program for label printing.

In the above kiosk terminal, it is preferable that an electronic payment means which performs electronic payment for a content-recorded disk making fee needed for making the content-recorded disk is further provided, and the electronic payment means calculates the content-recorded disk making fee based on the selection result of the content file and necessity for label printing with the operation section.

According to the above configuration, a profit is generated by using the electronic payment means. Also, as the content-recorded disk making fee is calculated based on a content file selection result and necessity for label printing, a total fee corresponding to a recording time and a printing cost (ink cost, toner cost and the like) can be charged as content-recorded disk making fee.

According to yet another aspect of the invention, there is provided a program which causes a computer to execute each of the steps in the method of controlling the printing apparatus.

The program makes it possible to obtain a printing apparatus which executes label printing easily, the content being recognized with label printing.

BEST MODES FOR CARRYING OUT THE INVENTION

A printing apparatus, a content-recorded disk making apparatus, a kiosk terminal, a method for controlling the printing apparatus and a program therefor of a preferred embodiment according to the invention, will be explained in detail with reference to attached drawings hereinbelow. The invention is such that a content file can be recognized at a glance by printing some of the scenes in the content file to be recorded in an optical disk on a label face thereof. An example of the printing apparatus of the invention adopted to a kiosk terminal (an unmanned information terminal) which is capable of recording the content file and printing on the label face will be explained.

Figure 1:
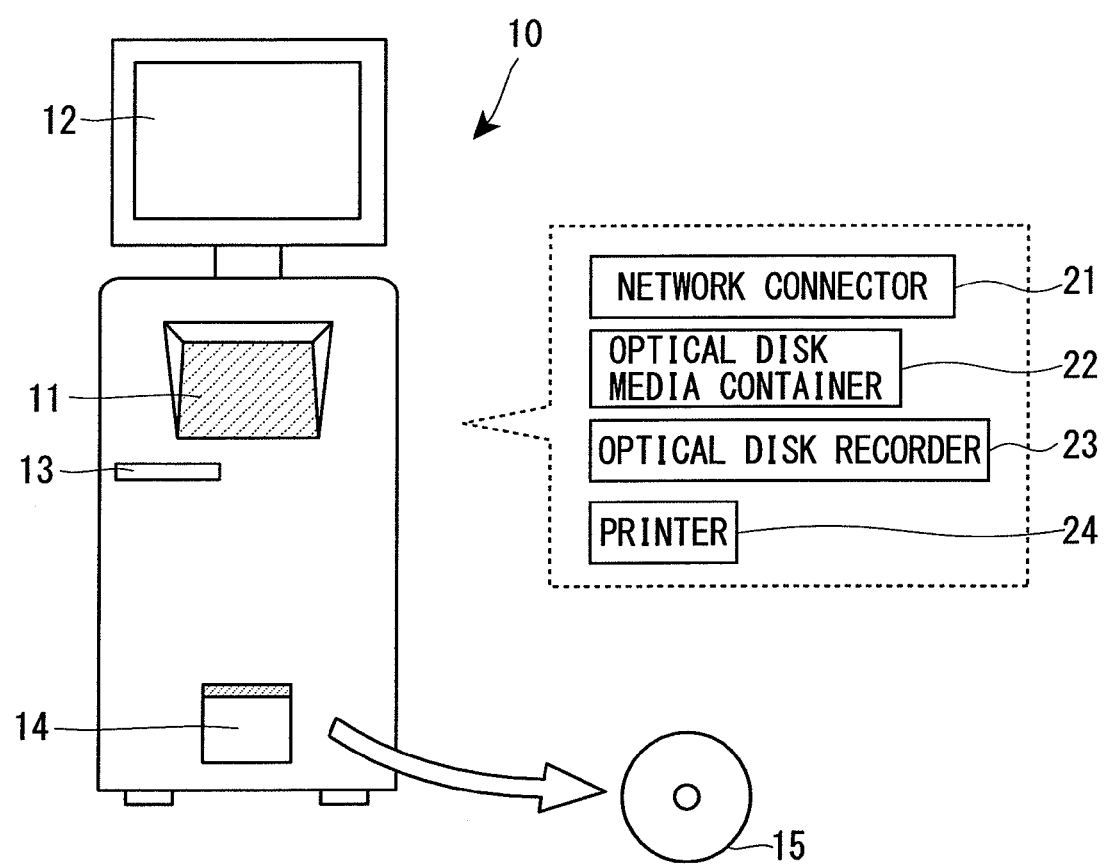
FIG. 1 is a hardware structure diagram of a kiosk terminal according to a preferred embodiment of the invention.

FIG. 1 is a hardware structure diagram of a kiosk terminal 10 of the invention. As shown in FIG. 1, the kiosk terminal 10 of the invention has a touch panel 11 (an operation section) with which a user performs various operations, a display 12 (a display section) which displays various pieces of information, a credit card insert slot 13 in which a credit card for electronic payment is inserted, and an optical disk eject section 14 at which a user can take out a DVD-R (a content-recorded disk) 15 with the recorded content file and a printed label face. Note that the touch panel 11 displays as same as the display 12 and has character input section (a keyboard function), thereby various pieces of information can be input.

The kiosk terminal 10 also has a network connector 21, an optical disk medium container 22, an optical disk recorder 23 and a printer 24. The network connector 21 is an interface for obtaining the content file via a network such as the Internet. The optical disk medium container 22 contains a plurality of unrecorded DVD-Rs 15 (optical disk media). The optical disk recorder 23 writes in the DVD-R 15 and the printer 24 prints on the label face of the DVD-R 15.

Figure 2:
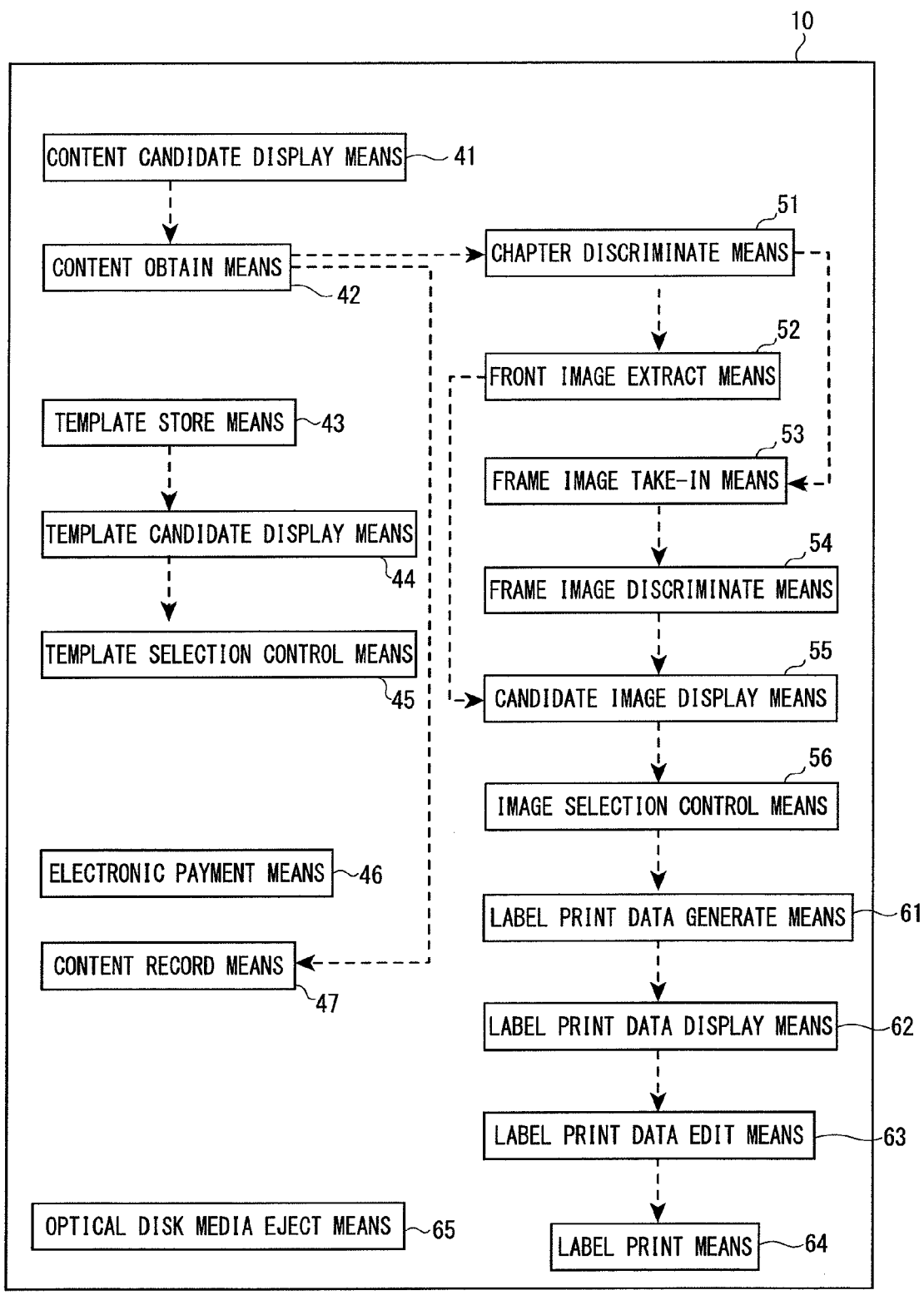
FIG. 2 is a control block diagram of the kiosk terminal.

Referring to a block diagram of FIG. 2, a control structure of the kiosk terminal 10 will be explained. The kiosk terminal 10 has, as control structure (a software configuration), content candidate display means 41, content obtaining means 42, template store means 43, template candidate display means 44, template selection control means 45, electronic payment means 46, content record means 47, chapter discriminating means 51, front image extract means 52, frame image take-in means 53, frame image discriminating means 54, candidate image display means 55, image selection control means 56, label print data generating means 61, label print data display means 62, label print data edit means 63, label print means 64 and optical disk medium eject means 65.

The content candidate display means 41 displays selection candidates of the content file on the display 12. Specifically, the means 41 displays a past television broadcasting program as "selection candidates of the content file" (see FIG. 4B). The "selection candidates of the content file" is not limited to the above and may be so structured that a content file which is extracted based on a broadcasting genre or a performer is selected. In other words, the user can designate a predetermined search keyword and a list of a search result may be displayed as "selection candidates of the content file".

The content obtaining means 42 obtains a corresponding content file via the network connector 21 based on a selection result of the content file with the touch panel 11. Content files are, for example, stored in a server of a broadcast station or a content intermediary agent and each of them is fetched from the server. Note that a contract shall be preliminary concluded between an operating company operating the kiosk terminal 10 and a provider of the content file in terms of copy right, etc.

Further, the content obtaining means 42 can obtain associated content information including a title of the content, a producer of the content, casts, a summary (content), a volume (reproduce time) and the like, in addition to the content file. Therefore, when the associated content information is obtained, the label print data generating means 61 described later generates a title data which is printed as title T (see FIG. 6B) based on the associated content information of the selected content file. Metadata for a television broadcasting, etc. may be used as associated content information. On the other hand, when the associated content information is not obtained, the label print data generating means 61 extracts title information from the content file to generate the title data.

The template store means 43 stores a plurality of templates (see a reference numeral 113 in FIG. 5A) of a label print data printed on the label face of the DVD-R 15. The template candidate display means 44 displays the plurality of various templates stored in the template store means 43 as selection candidate. The template selection control means 45 controls the display 12 and the touch panel 11 to support a user's selection operation and determines which template should be used. In other words, the user can select a desired template among the plurality of various templates 113 displayed by the template candidate display means 44. The templates, for example, can be prepared for an upper part and a lower part of a print face. In that case, two or more than two templates can be combined, thereby a printing style more fitted in a user's preference can be provided.

The electronic payment means 46 is used for making payment electronically for a content-recorded disk making fee needed for making the content-recorded disk. The electronic payment means 46 also calculates the content-recorded disk making fee based on the selection result of the content file with the touch panel 11 and necessity for label printing. The content-recorded disk making fee may be calculated based on not only the necessity for label printing but also the selection result of the template. In this case, for example, it is defined that the content file costs 800 Japanese Yen per hour and the template costs between 200 to 500 Japanese Yen according to the selection result. The content-recorded disk making fee may be calculated by totalizing the content file fee and the template fee. Further, the electronic payment means 46 is constituted capable of making payment by a credit card or a membership card with an electronic payment function, and includes card information readout means for the credit card and authentication means for allowing an authentication server (not shown) to authenticate card information. The electronic payment means 46 moreover can make electronic payment (a mobile wallet or the like) by a mobile phone (not shown). In a case that the kiosk terminal 10 is adapted to a making payment with cash input, it includes coin/paper currency discriminating means.

The content record means 47 allows the optical disk recorder 23 to record the content file obtained by the content obtaining means 42 on the DVD-R 15 conveyed from the optical disk medium container 22.

The chapter discriminating means 51 discriminates whether a plurality of chapters are included in the content file obtained by the content obtaining means 42. As described above, the kiosk terminal 10 can provide a past television broadcasting program. In the case that the content file is the television broadcasting program, it is preferable that each of the chapters is delimited per commercial film. According to the structure, it is easily possible to impart a chapter automatically without user's help.

The front image extract means 52 functions when the chapter discriminating means 51 discriminates that the plurality of chapters are included in the content file, and extracts front images of respective chapters from the content file. When each of the chapters is delimited per commercial film as described above, it is preferable that an image just after the commercial film is included in the front image per chapter. Also, it is preferable that the chapters are delimited such that the front image of the first chapter includes a program title at the beginning of the program. According to the structure, it is possible to extract a characteristic scene of the television broadcasting program.

The frame image take-in means 53 functions when the chapter discriminating means 51 discriminates that the plurality of chapters are not included in the content file (in a case that the content file is constituted by only one chapter or information on the chapter is not included, or the like), and takes in a plurality of frame images at a predetermined time interval from the content file. As described above, when the content file is the television broadcasting program, it is preferable that frame images are taken in from a main part of the television broadcasting program except the commercial films. According to the structure, it is possible to avoid using a scene erroneously in the commercial film irrelevant of the main part of the program for label printing.

The frame image discriminating means 54 discriminates whether each of the frame images taken in by the frame image take-in means 53 is appropriate for printing on the label face. More specifically, the means 54 compares the taken-in frame image with the former and latter frame images thereof, and discriminates a scene having a lesser motion as an appropriate image when the differences thereof are small. This makes it possible that a smudgy image such as a blurred image can be excluded from a label printing target. The discrimination, that is, "whether the image is appropriate for printing on the label face", may be made based on various discriminating criteria such that an image with only text is inappropriate or an image with a face of a person is appropriate from a result of an image analysis.

Also, the frame image discriminating means 54 discriminates how many images appropriate for printing on the label face are included in the frame images taken in by the frame image take-in means 53. In this instance, when the frame images discriminated as appropriate are less than the predetermined number, the frame image take-in means 53 takes in a plurality of frame images again at a different time interval from the above predetermined time interval. In short, the frame image take-in means 53 repeats taking-in the frame images till the predetermined number of frame images appropriate for printing on the label face can be obtained.

The candidate image display means 55 displays the front image per chapter extracted by the front image extract means 52 or frame images which are more than the predetermined number of frame images discriminated as appropriate for printing on the label face on the display 12 as candidate images for printing on the label face.

The image selection control means 56 controls the display 12 and the touch panel 11 to support the user's selection operation and is adapted to select print target images (images which the user prefers) among candidate images displayed by the candidate image display means 55. It is preferable that the number of selectable print target images is displayed according to a selected template by the template selection control means 45 and that print target images are selected by the user according to the displayed number.

The label print data generating means 61 generates the label print data based on the content file obtained by the content obtaining means 42, the template selected by the template selection control means 45 and the print target images selected by the image selection control means 56. In other words, the label print data is generated by arranging the predetermined number of print target images according to the selected template and by generating the title data based on the associated content information obtained with the content file.

The label print data display means 62 displays the label print data generated by the label print data generating means 61 on the display 12 (a label print preview). The label print data displayed is editable by the label print data edit means 63 described later.

The label print data edit means 63 edits the label print data displayed by the label print data display means 62. More specifically, the means 63 changes templates and modifies arrangement of the print target images. In addition, the means 63 can edit such as movements of positions of design patterns, decorations (frames or underlines), logos or characters, modifications of size, angle, color, and character font, and can make the touch panel 11 input characters.

The label print means 64 prints the label print data edited by the label print data editing means 63 (in a case no editing is made, the label print data generated by the label print data generating means 61) by the printer 24 on the DVD-R 15 before or after recording by the content record means 47.

The optical medium eject means 65 ejects the content-recorded disk in which the content file has been recorded by the content record means 47 and the label face thereof has been printed by the label print means 64.

Figure 3:
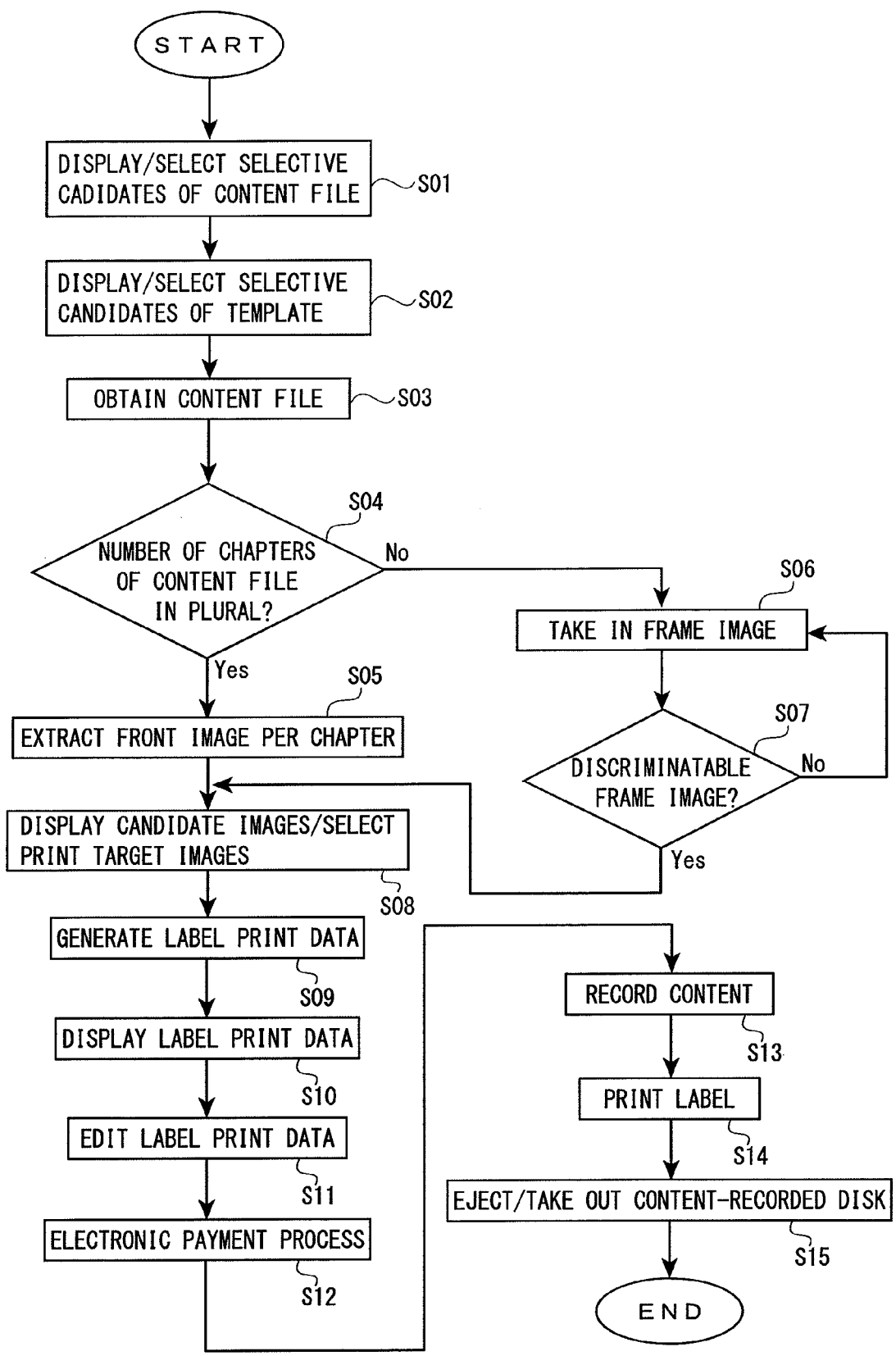
FIG. 3 is a flowchart showing a control method of the kiosk terminal.

A control method for the kiosk terminal 10 (a content-recorded disk making service) will be explained in summary with reference to a flowchart of FIG. 3. The selection candidates of the content file are displayed on the display 12 and the user is urged to select (S01). A past television broadcasting program list (EPG data or the like) is displayed as content file selection candidate. In a similar fashion, the selection candidates of the templates are displayed on the display 12 and the user is also urged to select (S02). When a desired content file and a template are selected by the user, the content file (and the associated content information) is obtained via the network connector 21 (S03).

Then, the number of chapters of the obtained content file is discriminated (S04). When it is discriminated that a plurality of chapters exist in the content file (S04: Yes), the front image per chapter is extracted (S05). On the other hand, when it is discriminated that a plurality of chapters do not exist in the content file (S04: No), frame images are taken in from the content file at the predetermined time interval (S06), and it is discriminated whether the taken-in frame images are appropriate for label printing (S07). Also, in S07, it is discriminated whether the number of the frame images discriminated as appropriate are equal or more than the predetermined number. If the number of the frame images are less than the predetermined number (S07: No), the frame images discriminated as appropriate are cached and deficient frame images are taken in again (S06).

Then, the front image per chapter extracted in S05 or the predetermined number of frame images discriminated as appropriate for label printing in S07 are displayed on the display 12 as candidate images and the user is urged to select print target images (S08). The label print data is generated based on the selected print target images or the content file and the template selected in S01 and S02 (S09). The label print data is displayed on the display 12 (S10). The label print data may be edited based on the user's operation with the touch panel 11 as needed (S11).

An electronic payment process for the content-recorded disk making fee calculated based on the selection result of the content file and the like is done after a content of the label print data is fixed (S12). After the electronic payment process, the content file is recorded on the DVD-R 15 (S13), the label face is printed (S14), and the produced content-recorded disk is ejected to the optical disk media eject section 14 (S15). The ejected DVD-R 15 is taken out by the user.

A further detailed operation of the kiosk terminal 10 will be explained with reference to FIGS. 4 to 7 showing screen transitions (display examples of the display 12 and the touch panel 11). Buttons (icons) for switching a screen to a previous or a next screen and the explanation thereof are omitted. Each of the screens corresponding to processes shown in the flowchart of FIG. 3 is added with a parenthetic process number used in the flowchart.

Figure 4A:
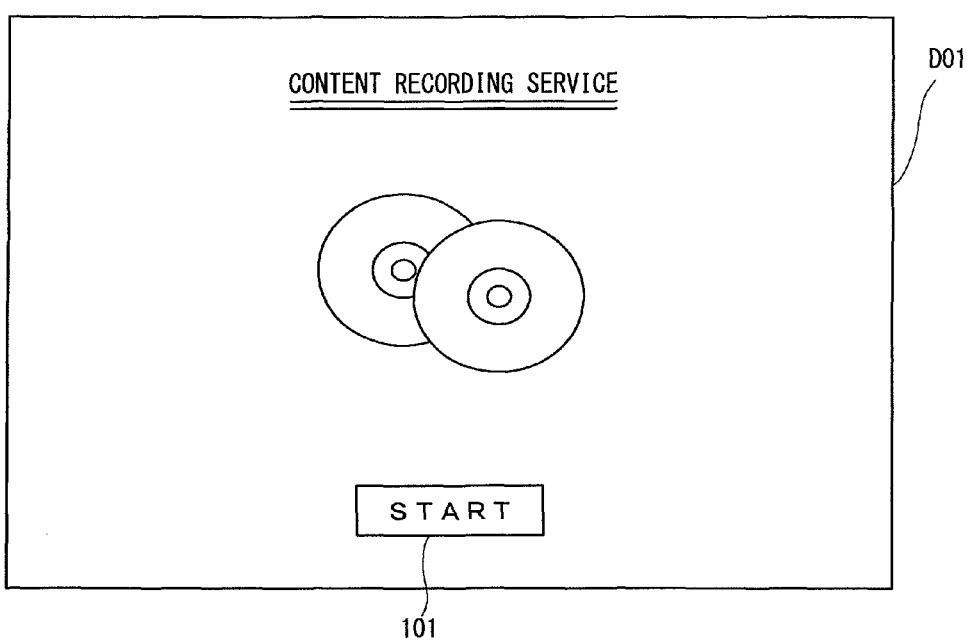
FIG. 4 is a diagram showing a screen display example of the kiosk terminal.
Figure 4B:
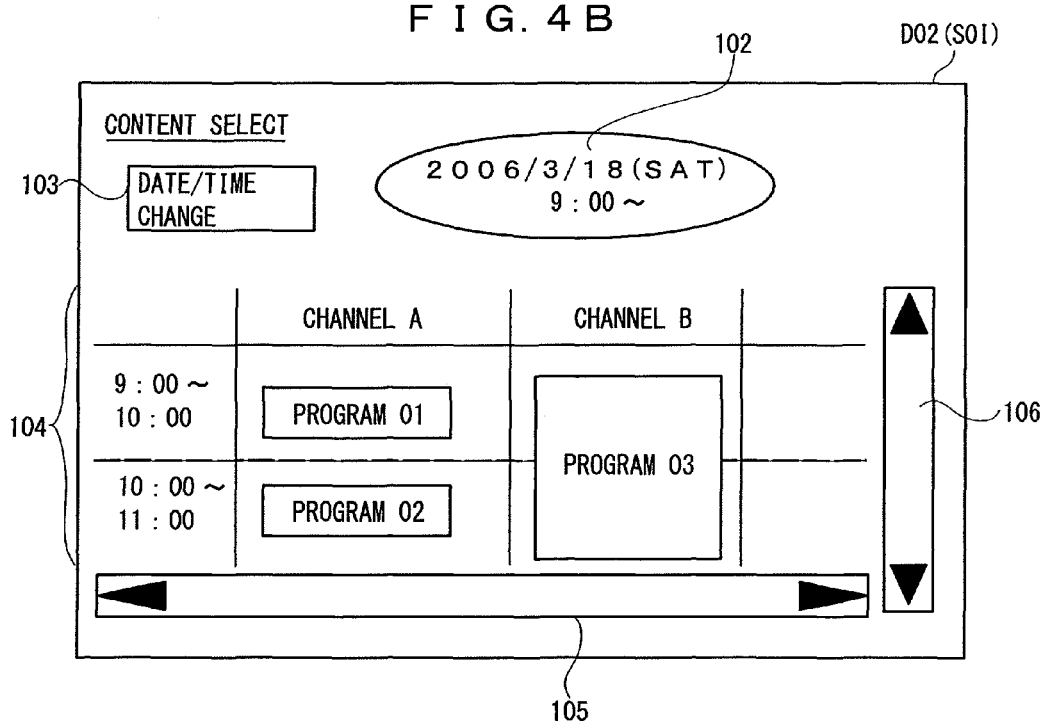

As shown in FIG. 4A, when a "start button" 101 is depressed in a content recording service initial screen D01, as shown in FIG. 4B, a content select screen D02 is displayed. The screen D2 shows a part of the television program list, "after 9:00 AM, Mar. 18 (Saturday), 2006" (102) as selection candidate 104. A television program list of 24 hours before a content recording service has begun is shown as default value of the selection candidates 104. In a case that date and time of the television program list needs to be changed, a "date/time change" button 103 is depressed by the user. It is also possible to change a period of time of the television program list displayed by operating a display move bar 106. It is further possible to change channels of the television program list displayed by operating the display move bar 105.

Figure 5A:
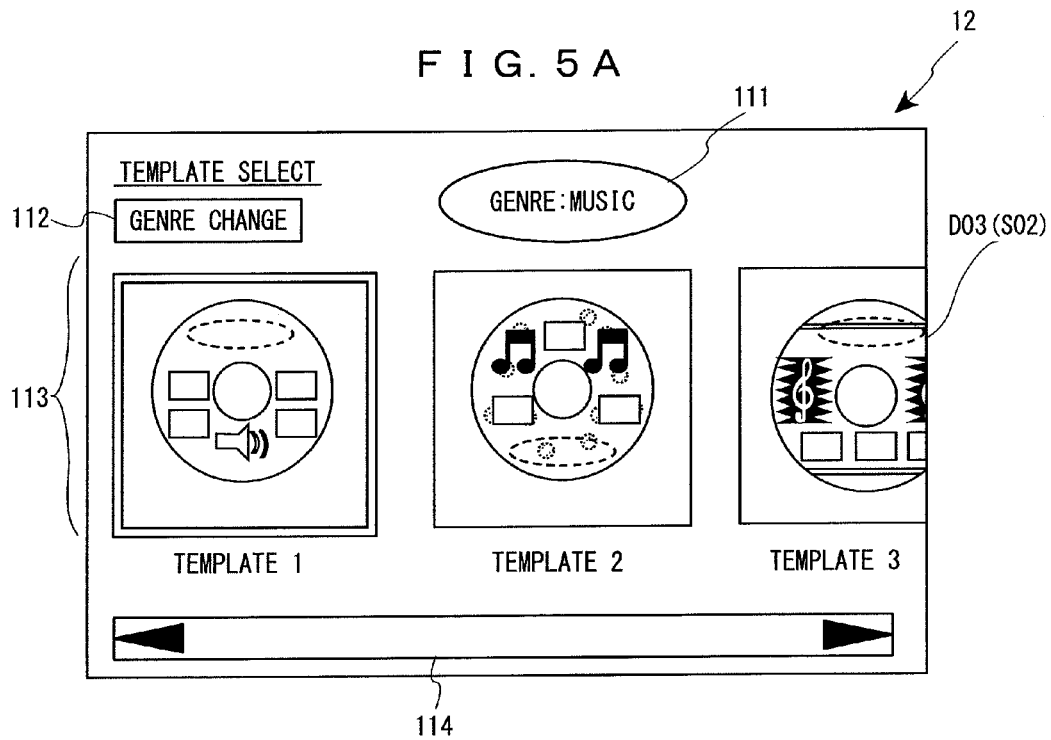
FIG. 5 is a diagram showing a screen display example of the kiosk terminal following FIG. 4.

FIG. 5A shows a template select screen D03. The screen D03 shows a list of templates of "genre: music" (111) as selection candidates 113. In a case that a genre needs to be changed, a "genre change" button 112 is depressed by the user. A "movie", a "television" and the like may be provided as other genres. Types of design patterns such as a "floral design", a "character", and a "stripe" may be selected as genre. Further, a purpose for gift-giving such as "for birthday", "for celebration" and the like of the produced disk may be used as genre. In the screen D03, other templates included in the "genre: music" can be displayed by operating a display move bar 114. As shown in the selection candidates 113, the number of printable images is predetermined per template (for example, four images can be printed in a template 1, three images can be printed in a template 2). The user selects the print target images based on the number of images in the print target image select screen (D04 or D05).

Figure 5B:
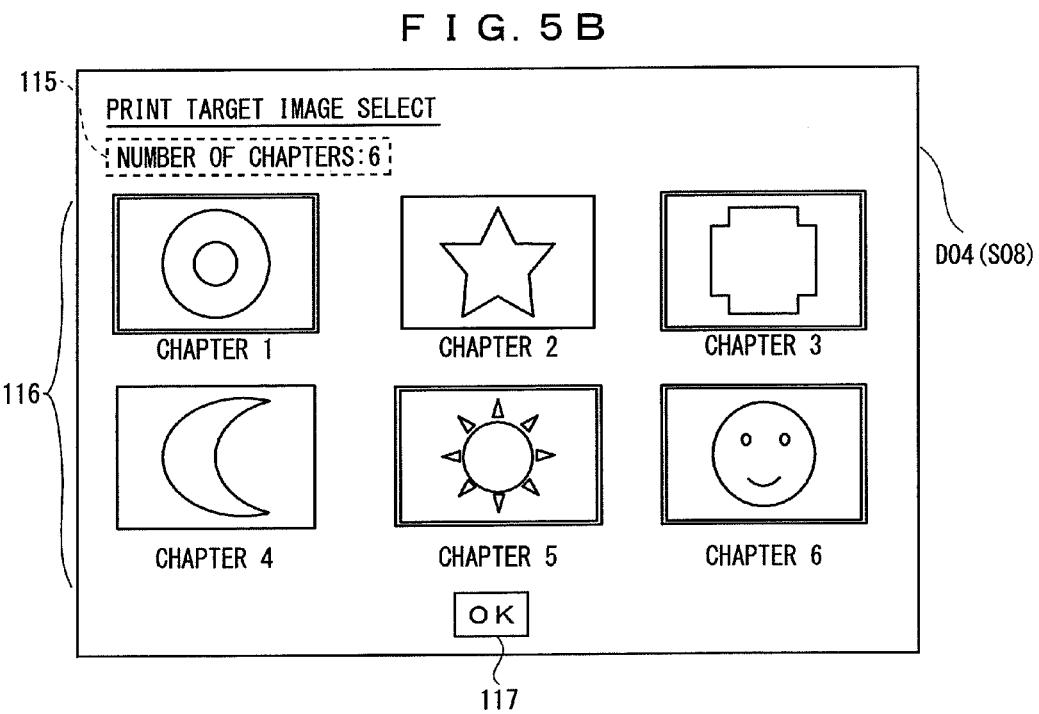

FIG. 5B shows the print target image select screen D04 in which a plurality of chapters is included in the content file. In the screen D04, six chapters are included in the content file (see a reference numeral 115). If only two chapters are included, the two candidate images are displayed. In FIG. 5B, the front image per chapter is displayed. For example, when the template 1 in which four images can be placed is selected in the template select screen D03, four print target images are selected (in the example shown, a "chapter 1", a "chapter 3", a "chapter 5", and a "chapter 6" are being selected). After the selection, when an "O.K." button 117 is depressed by the user, a next screen (D06 shown in FIG. 6B) is displayed.

Figure 6A:
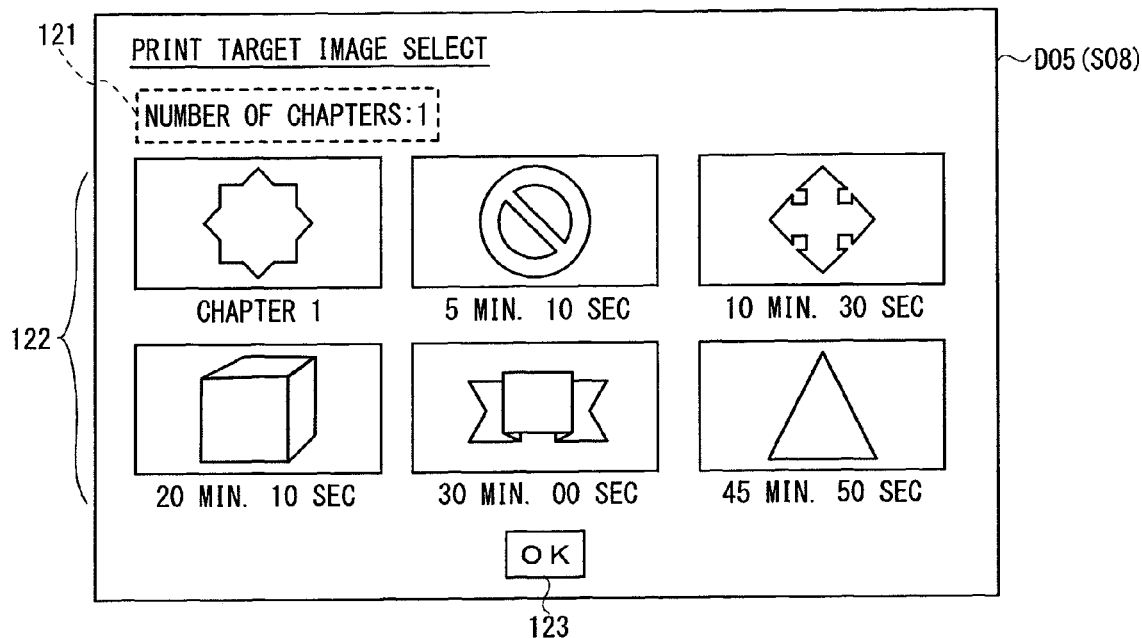
FIG. 6 is a diagram showing a screen display example of the kiosk terminal following FIG. 5.

FIG. 6A shows, on the other hand, the print target image select screen D05, in which a plurality of chapters are not included in a content file. For example, in this case, only one chapter is included in the content file (see a reference numeral 121). Frame images are taken in at the predetermined time interval and only the images appropriate for label printing among them are displayed. A reproducing time of the taken in scene is shown in each of the images and the images are arranged in chronological order. Also, as same as the above mentioned print target image selection screen D04, when the template 1 in which four images can be placed is selected in the template select screen D03, four print target images are also selected. After the selection, when an "O.K." button 123 is depressed by the user, a next screen (D06 shown in FIG. 6B) is displayed.

In the print target image select screen D05 of FIG. 6A, "six" candidates are set as the predetermined number shown as selection candidate. Therefore, when equal or less than "five" appropriate frame images are obtained, a take-in process is repeated till "six" appropriate frame images can be obtained. In a case more than "seven" appropriate frame images are taken in with a single take-in operation, all of the images may be displayed as candidate image, or "six" images which are more appropriate (having less motion scene) may be selected among them to be displayed.

Also, in the print target image select screen D05, a predetermined time interval may be set by the user, and a frame image of a scene on reproducing designated by the user may be taken in by displaying reproducing screen of the content file.

When the number of chapters included in the content file is equal or less than the predetermined number, deficient images may be compensated by taking-in for frame images. In short, when the number of chapters included in the content file is "two", two front images thereof are extracted as candidate image. Then, frame images are taken in within the content file at the predetermined time interval to obtain appropriate four images. Therefore, six candidate images in total are displayed in the print target image select screen. In this case, it is preferable that the candidate images are arranged in chronological order, and that each of the candidate images includes a chapter number and a reproducing time.

Also, in the print target image select screen D04, when the extracted front images are not in the user's favor, it is also possible to take in a frame image forcibly by user's instruction. In this case, a "frame image take-in" button (not shown) is provided in the print target image select screen D04 and taking in a frame image is executed in accordance with the user's instruction. It may be possible that a plurality of front images adapted to the user's favor is designated and taking in a frame image is performed so as to display both of the images on the print target image select screen as candidate image.

Figure 6B:
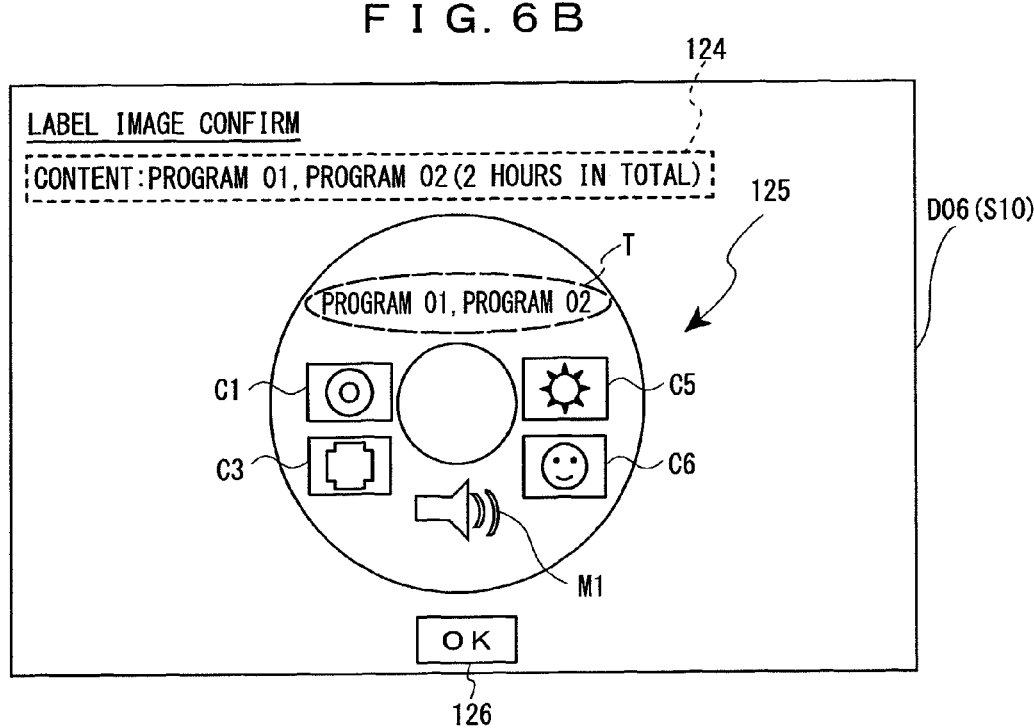

FIG. 6B shows a label image confirm screen D06. In the screen D06, as shown with a reference numeral 124 and T, a "program 01" and a "program 02" (program titles) are selected as content file in the screen D2 of FIG. 4B. Also, the template 1 is selected (see a reference numeral 125) in the screen D03 of FIG. 5A, and the front images (print target images) of the "chapter 1", the "chapter 3", the "chapter 5", and the "chapter 6" are selected in the screen D04 of FIG. 5B. When an "O.K." button 126 is depressed by the user, a next screen (D07) is displayed. When an operation for switching back to the previous screen is made in the label image confirm screen D06, it is possible to change templates and re-select print target images.

Figure 7A:
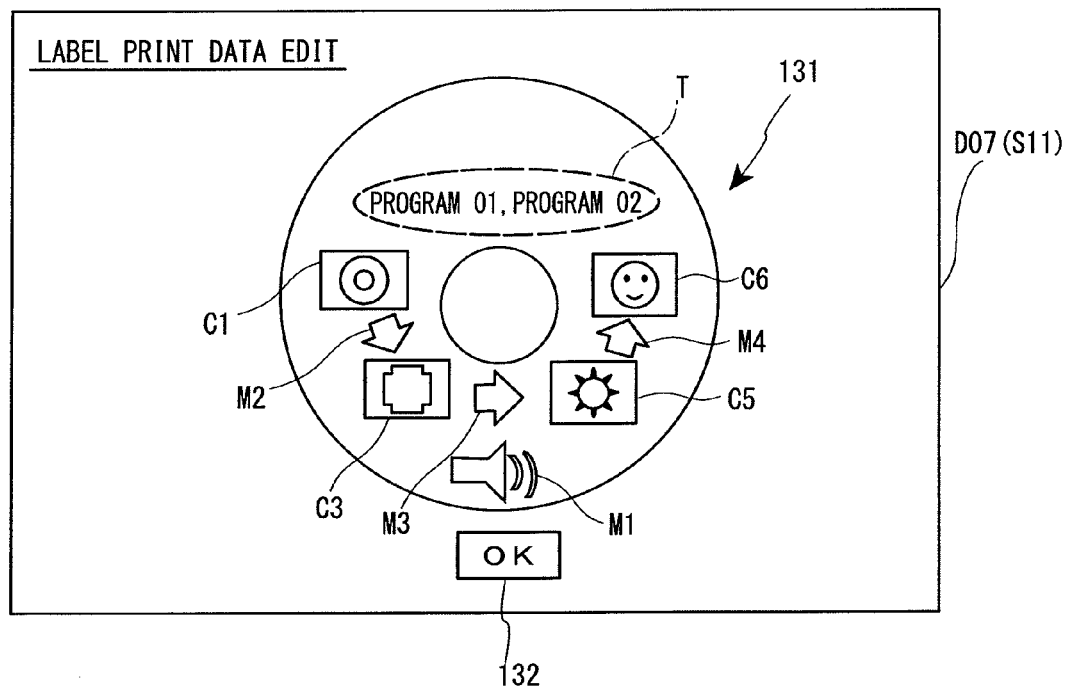
FIG. 7 is a diagram showing a screen display example of the kiosk terminal following FIG. 6.

FIG. 7A shows a label print data edit screen D07. In the screen D07, a position change for mark M1, arrangement changes for print target images C1, C3, C5 and C6, and additions of Mark M2, M3 and M4 are performed (see a reference numeral 131). These are based on the user's operation with the touch panel 11. In addition, character input (a sub title of a broadcasting program, a name of a broadcasting station, a broadcasting date, a summary of a program, a song number, a message with which the content-recorded disk is used as gift-giving or the like), a design pattern, a decoration, a position movement of a logo or a character, change of size, angle, and color or the like may be made besides changes of character fonts, etc. Then, when an "O.K." button 132 is depressed by the user, a next screen (D08) is displayed.

Figure 7B:
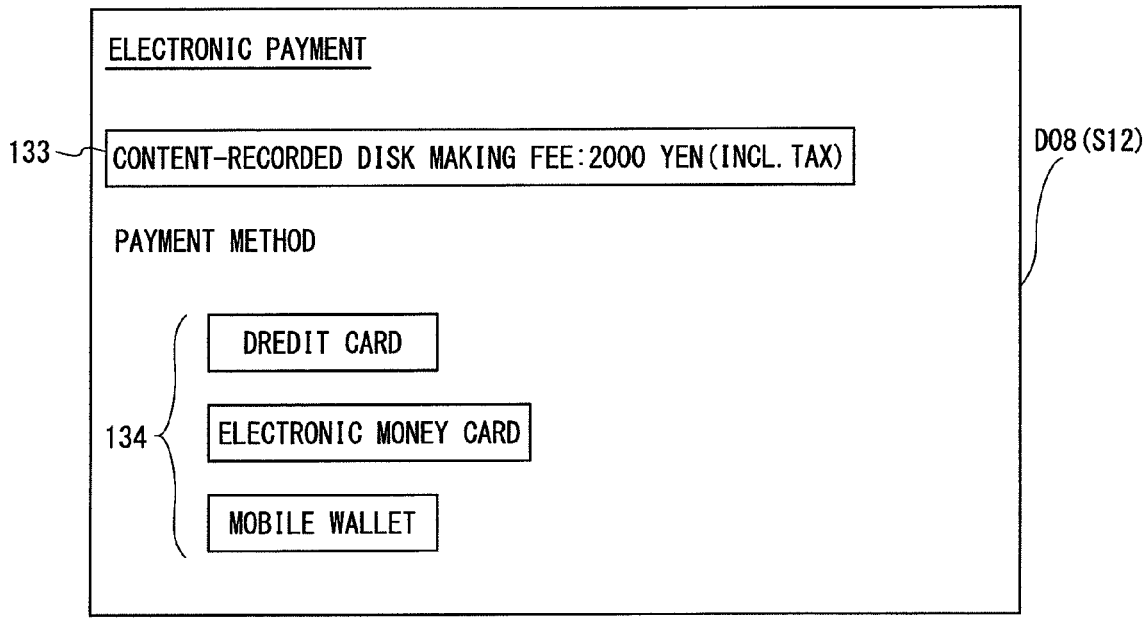

FIG. 7B shows an electronic payment screen D08. In the screen D08, a content-recorded disk making fee calculated based on the content file and the like selected by the user is displayed in a fee display section 133. It is also possible to select a payment method which the user prefers with buttons 134. When the payment method is selected, the electronic payment process is executed according to the selection.

As described above, with series of user's operations based on the screens shown in FIGS. 4 to 7, respective processes such as recording of the content file, label printing, ejecting of the content-recorded disk and the like are performed, and a content of each of the processes is displayed on the display 12 according to these processes. At this time, a remaining time to a completion of manufacturing (till the content-recorded disk is ejected) is also displayed on the screens. Advertising movies by a shop placed with the kiosk terminal 10, a management company of the kiosk terminal 10, or a content file providing company etc. may be displayed simultaneously. According to the structure, the user can spend his/her waiting time needed for making a content-recorded disk effectively.

As described above, according to the embodiment, as the label is printed based on the front image per chapter extracted from the content file, or the plurality of frame images taken in from the content file at the predetermined time interval, a scene which is at least a part of the content can be printed, thereby the user can recognize the content with the printed object. Therefore, even if the user is a beginner, a label can be printed easily, by which the content can be recognized. As a front image of a chapter is extracted on a priority basis, the extracted image is rarely obscure and a characteristic scene can be used for label printing. Further, in a movie case and the like, as a content file has a plurality of chapters and a plurality of front images are extracted, it is possible to print a label by which the content can be more clearly recognized.

Also, based on a template, as print target images selected by the user are placed, more attractive label printing is made more easily. As the user can select a desired template, it is possible to print a label which the user prefers.

In a case that a plurality of chapters is not included in a content file, a label is printed based on a plurality of frame images taken in from the content file at a predetermined time interval. Therefore, the label can surely be printed with a plurality of scenes, thereby the label is printed appropriate for recognizing the content.

In a case frame images are taken in, as each of the taken-in frame images is discriminated whether it is appropriate for printing on a label face, thereby inappropriate images can be eliminated based on the discriminating result.

As the kiosk terminal 10 provides a content-recorded disk making service by which recording of a content file and printing on a label face are made, the user can obtain the content file readily. Also, as the kiosk terminal 10 as an unmanned information terminal is used, a provider for setting the kiosk terminal 10 can have an advantage by which labor costs are cut and a user can have an advantage by which a preferred content file can be selected clandestinely.

As the electronic payment means 46 is provided, a shop provided with the kiosk terminal 10 and a management company of the kiosk terminal 10 can make a profit. As the content-recorded disk making fee is calculated based on a content file selection result and necessity for label printing, a total fee corresponding to a recording time and a printing cost (an ink cost, a toner cost and the like) can be charged as content-recorded disk making fee.

In the example above, content recording and label printing are made by the kiosk terminal 10, but it may be possible to adapt the preferred embodiment to a content-recorded disk making apparatus only capable of content recording and label printing. It may also be possible to adapt the preferred embodiment to a printing apparatus capable of label printing based on a read out result of the content file. In other words, a printing apparatus having means which can obtain a reproducing data of the content file (a data obtain function via a cable or a content file readout function) can achieve the invention.

In the example above, face direct printing is exemplified, in which the label face of the DVD-R 15 (optical disk) is directly printed, but the invention can be also applied to label printing by which a label to be adhered on the label face is printed. In addition to a DVD-R, the invention can be applied to other recording type disks on which a label can be printed.

Also, in the example above, in the case that only one chapter is included in the content file, taking in frame images is made. Instead of taking in frame images, it may be possible that only one candidate image is displayed by the candidate image display means 55, and that the image selection control means 56 selects whether the candidate image is used in label printing. In the case that chapter information is not included in the content file, only one front image of the content file may be displayed as candidate image.

It may further be possible to omit the chapter discriminating means 51 and the front image extract means 52, and to take in frame images independent on the number of chapters included in the content file.

It may be possible to provide each of the structure elements (each function) of the kiosk terminal 10 as program. It may also be possible to provide the program stored in a recording medium (a CD-ROM, a flash ROM, a memory card or the like). Therefore, the program and the recording medium storing the program are also included in a scope of the invention.

It is further understood by those skilled in the art that various changes and modifications of apparatus structure and process procedures of the kiosk terminal 10 may be made other than the preferred embodiment without departing from the spirit and scope thereof.

The invention claimed is:

1. A printing apparatus comprising:
   a chapter discriminating means that discriminates whether a plurality of chapters are included in a content file including image information as recorded target on an optical disk medium;
   a front image extracting means that extracts a front image of each chapter when the plurality of chapters are discriminated;
   a frame image take-in means that takes in a plurality of frame images at a predetermined interval from the content file when the plurality of chapters are not discriminated;
   a frame image discriminating means that discriminates whether each of the taken-in frame images is appropriate for printing on a label face by comparing each of the frame images taken in by the frame image take-in means with prior and following frame images thereof and using a discriminating result whether differences between the taken-in frame images and the prior and following frame images thereof are small;

a label print data generating means that generates label print data to be printed on the label face of the optical disk medium based on the front image or frame images discriminated as appropriate for printing on the label face by the frame image discriminating means; and a label print means that prints the label print data generated on the label face of the optical disk medium.

2. The printing apparatus according to claim 1 wherein the frame image take-in means repeats taking in the plurality of frame images at another time interval different from the predetermined time interval when the frame images discriminated as appropriate for printing on the label face by the frame image discriminating means are less than a predetermined number.

3. The printing apparatus according to claim 2 further comprising:

a candidate image display means that displays frame images more than the predetermined number discriminated as appropriate for printing on the label face by the frame image discriminating means as candidate to be printed on the label face; and an image selection control means that supports and controls selection for print target images among the candidate images displayed, wherein the label print data generating means generates the label print data based on the print target images selected.

4. The printing apparatus according to claim 3 further comprising:

a template store means that stores a plurality of templates for the label print data, template candidate display means that displays the plurality of templates as selection candidate; and a template selection control means that supports and controls a selection for at least one template among the plurality of templates displayed, wherein the label print data generating means generates the label print data by reading out the template selected from the template store means by the template selection control means and placing the print target images selected by the image selection control means according to a read out template.

5. The printing apparatus according to claim 4 further comprising:

a label print data display means that displays the label print data generated by the label print data generating means; and a label print data edit means that performs an edit operation including change of the templates or modification of arrangement positions for the print target images regarding a label print data displayed, wherein the label print means print edited label print data.

6. A content-recorded disk making apparatus comprising:

each of the means in the printing apparatus according to claim 1; and a content record means that records the content file on the optical disk medium.

7. A kiosk terminal including:

each of the means in the content-recorded disk making apparatus according to claim 6;

a network connector that obtains a content file via a network;

an optical disk medium container capable of receiving a plurality of optical disk media therein;

an operation section that selects information and inputs information;

a display section that displays various pieces of information;

an optical disk recorder that writes in an optical disk medium with the content record means;

a printer that prints on a label face of the optical disk medium with the label print means; and an optical disk eject section at that the optical disk medium is taken out, wherein the kiosk terminal further comprises:

a content candidate display means that displays selection candidates of the content file on the display section;

a content obtaining means that obtains a corresponding content file via the network connector based on a selection result of the content file with the operation section; and an optical disk medium eject means that ejects a content-recorded disk to the optical disk eject section, the disk being fed from the optical disk medium container, recorded the content file therein with the optical disk recorder and printed on the label face thereof by the printer.

8. The kiosk terminal according to claim 7 wherein the content file is a recorded file in which a broadcasting program is recorded, and the content candidate display means displays a past broadcasting program list as selection candidate of the content file.

9. The kiosk terminal according to claim 7 further comprising an electronic payment means that performs electronic payment for a content-recorded disk making fee needed for making the content-recorded disk, wherein the electronic payment means calculates the content-recorded disk making fee based on the selection result of the content file and necessity for label printing with the operation section.

* * * * *